(12) United States Patent
Yamamoto

(10) Patent No.: US 7,848,614 B2
(45) Date of Patent: Dec. 7, 2010

(54) VIEWING PROGRAM CONTROL METHOD AND VIDEO RECORDING APPARATUS

(75) Inventor: Takayuki Yamamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1177 days.

(21) Appl. No.: 11/487,582

(22) Filed: Jul. 17, 2006

(65) Prior Publication Data
US 2007/0116430 A1 May 24, 2007

(30) Foreign Application Priority Data
Nov. 1, 2005 (JP) ............... 2005-317871

(51) Int. Cl.
*H04N 5/91* (2006.01)
*H04N 7/00* (2006.01)

(52) U.S. Cl. .......................... 386/83; 386/46

(58) Field of Classification Search ............ 386/46, 386/83, 124, 125, 1, 95
See application file for complete search history.

(56) References Cited

U.S. PATENT DOCUMENTS 6,324,338 B1 * 11/2001 Wood et al. ............... 386/83

2008/0229352 A1 * 9/2008 Pino et al. ............... 725/22

FOREIGN PATENT DOCUMENTS

| JP | 5-62283 | | 3/1993 |
| JP | 6-124309 | | 5/1994 |
| JP | 08125986 | * | 5/1996 |
| JP | 2005-184289 | | 7/2005 |
| WO | WO 2005/079058 A2 | | 8/2005 |

OTHER PUBLICATIONS

Chinese Office Action, with English Translation, issued in Chinese Patent Application No. CN 2006-10108372.1 dated on Nov. 28, 2008.

* cited by examiner

*Primary Examiner*—Robert Chevalier
(74) *Attorney, Agent, or Firm*—McDermott Will & Emery LLP

(57) ABSTRACT

In the content automatic recording and playback, if the recording and the playback are conducted according to a taste, the user's taste takes precedence and is emphasized. To cope with this situation, a scenario is disposed as a condition to restrict the taste. In the recording and the playback, the scenario acts upon the taste to guide the user to easily view contents matching the scenario. As a result, only by setting the scenario, it is possible to enhance the possibility to guide the user's taste according to a desire (scenario) while recording the contents matching the taste.

5 Claims, 12 Drawing Sheets

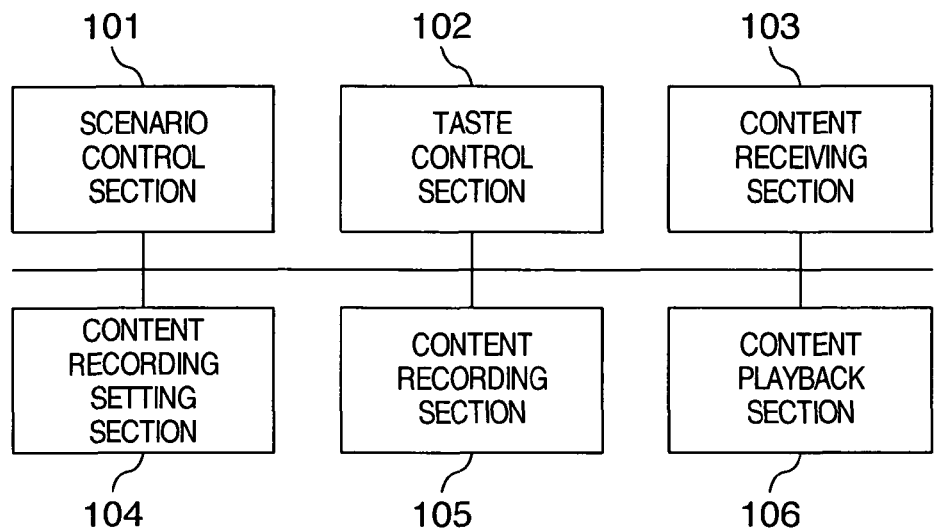
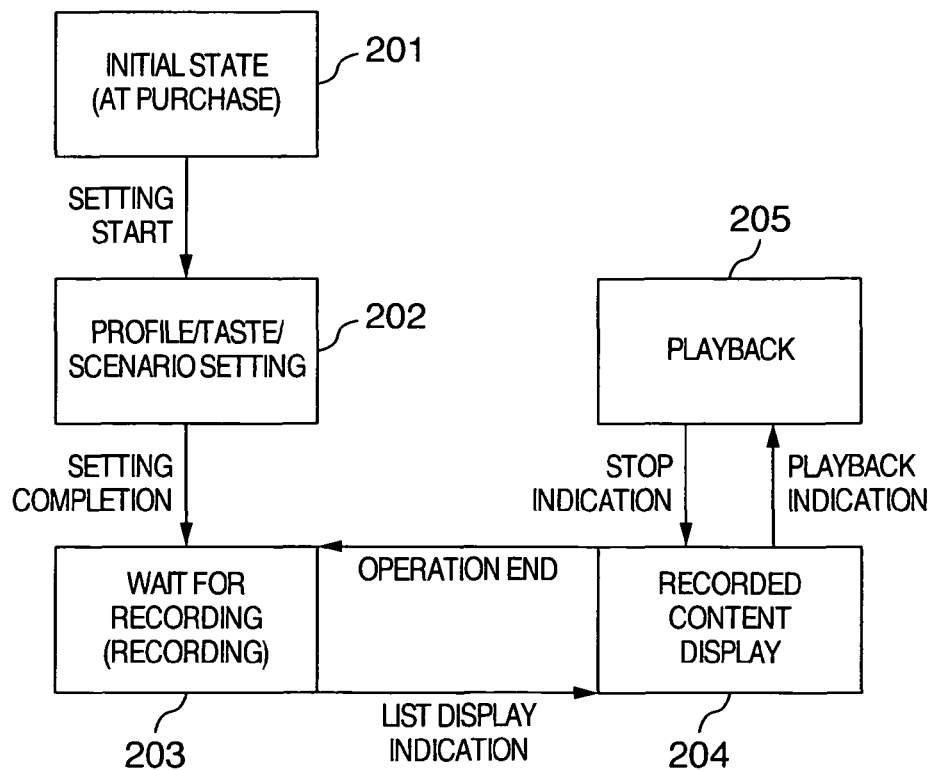

FIG.7

| | |
|---|---|
| 701 POSTAL CODE NO. OF ADDRESS | 251-0038 |
| 702 POSTAL CODE NO. OF WORKING PLACE | 252-0032 |
| 703 AGE | 5 |
| 704 SEX | MALE |
| 705 BUSINESS TYPE | NURSERY SCHOOL |
| 706 JOB TYPE | NURSERY SCHOOL CHILD |

FIG.9

| | | 901 GENERAL CATEGORY | 902 SPECIFIC CATEGORY | 903 EVALUATION | 904 KEYWORD | 905 INCENTIVE |
|---|---|---|---|---|---|---|
| 911 | RECOMMENDATION GENRE | EDUCATION | CONVERSATION·LANGUAGE | 80 | ENGLISH (+10) | Point +4 |
| | | | INFANT·ELEMENTARY SCHOOLCHILD | 100 | NATURAL SCIENCE (+10) | Point +5 CAKE |
| | | SPORTS | BASEBALL | 70 | YOKOHAMA (+5) | Point +2 |
| 912 | AVOIDANCE GENRE | ANIMATED FILM/SPECIAL-EFFECTS FILM | DOMESTIC ANIMATED FILM | 0 | | |
| | | | SPECIAL-EFFECTS FILM | 0 | XX SQUADRON (-10) | |

FIG.8

| | GENERAL CATEGORY | SPECIFIC CATEGORY | EVALUA-TION | KEYWORD |
|---|---|---|---|---|
| 811 | SPORTS | SPORTS NEWS | 50 | |
| | | BASEBALL | 40 | |
| | | FOOTBALL | 80 | |
| | | GOLF | 0 | |
| 812 | INFORMATION/ WIDE SHOWS | ENTERTAINMENT/WIDE SHOWS | 0 | |
| | | FASHION | 0 | |
| | | LIVING·HOME | 0 | |
| | | HEALTH/MEDICAL TREATMENT | 0 | |
| 813 | DRAMA | DOMESTIC DRAMA | 0 | |
| | | OVERSEAS DRAMA | 0 | |
| 814 | MUSIC | DOMESTIC ROCK'N'ROLL · POPS | 0 | |
| | | OVERSEAS ROCK'N'ROLL · POPS | 0 | |
| 815 | VAUDEVILLE | QUIZ | 0 | |
| | | GAME | 0 | |
| 816 | FILM | FOREIGN FILM | 80 | ACTION (+10) |
| | | JAPANESE FILM | 70 | ACTION (+10) |
| 817 | ANIMATED FILM/ SPECIAL-EFFECTS FILM | DOMESTIC ANIMATED FILM | 100 | XXXX MAN (+20) |
| | | OVERSEAS ANIMATED FILM | 70 | |
| | | SPECIAL-EFFECTS FILM | 100 | XX SQUADRON (+20) |
| 818 | DOCUMENTARY/ CULTURE | LOCAL NEWS/CURRENT EVENTS | 0 | |
| | | HISTORY/TRIP | 0 | |
| 819 | EDUCATION | CONVERSATION · LANGUAGE | 0 | |
| | | INFANT · ELEMENTARY SCHOOLCHILD | 0 | |
| | | JUNIOR HIGH SCHOOL STUDENT · SENIOR HIGH SCHOOL STUDENT | 0 | |

Columns: 801 GENERAL CATEGORY, 802 SPECIFIC CATEGORY, 803 EVALUATION, 804 KEYWORD

FIG.10

| | GENERAL CATEGORY | SPECIFIC CATEGORY | EVALUA-TION | KEYWORD |
|---|---|---|---|---|
| | | | 1001 1002 1003 1004 | |
| 1011 | SPORTS | SPORTS NEWS | 0 | |
| | | BASEBALL | 50 | |
| | | FOOTBALL | 50 | |
| | | GOLF | 0 | |
| 1012 | INFORMATION/ WIDE SHOWS | ENTERTAINMENT/WIDE SHOWS | 0 | |
| | | FASHION | 0 | |
| | | LIVING·HOME | 0 | |
| | | HEALTH/MEDICAL TREATMENT | 0 | |
| 1013 | DRAMA | DOMESTIC DRAMA | 0 | |
| | | OVERSEAS DRAMA | 0 | |
| 1014 | MUSIC | DOMESTIC ROCK'N'ROLL·POPS | 0 | |
| | | OVERSEAS ROCK'N'ROLL·POPS | 0 | |
| 1015 | VAUDEVILLE | QUIZ | 0 | |
| | | GAME | 0 | |
| 1016 | FILM | FOREIGN FILM | 80 | ACTION (+20) |
| | | JAPANESE FILM | 70 | ACTION (+20) |
| 1017 | ANIMATED FILM/ SPECIAL-EFFECTS FILM | DOMESTIC ANIMATED FILM | 50 | XXXX MAN (+20) |
| | | OVERSEAS ANIMATED FILM | 70 | |
| | | SPECIAL-EFFECTS FILM | 50 | XX SQUADRON (+20) |
| 1018 | DOCUMENTARY/ CULTURE | LOCAL NEWS/CURRENT EVENTS | 0 | |
| | | HISTORY/TRIP | 0 | |
| 1019 | EDUCATION | CONVERSATION·LANGUAGE | 80 | |
| | | INFANT·ELEMENTARY SCHOOLCHILD | 100 | |
| | | JUNIOR HIGH SCHOOL STUDENT· SENIOR HIGH SCHOOL STUDENT | 0 | |

FIG.11

| | GENERAL CATEGORY | SPECIFIC CATEGORY | RECORDING TIME | VIEWING TIME | OLD EVALUATION | NEW EVALUATION |
|---|---|---|---|---|---|---|
| 1111 | SPORTS | SPORTS NEWS | 0 | 0 | 50 | 30 |
| | | BASEBALL | 10 | 2 | 40 | 40 |
| | | FOOTBALL | 10 | 2 | 80 | 70 |
| | | GOLF | 0 | 0 | 0 | 0 |
| 1112 | INFORMATION/ WIDE SHOWS | ENTERTAINMENT/WIDE SHOWS | 0 | 0 | 0 | 0 |
| | | FASHION | 0 | 0 | 0 | 0 |
| | | LIVING·HOME | 0 | 0 | 0 | 0 |
| | | HEALTH/MEDICAL TREATMENT | 0 | 0 | 0 | 0 |
| 1113 | DRAMA | DOMESTIC DRAMA | 0 | 0 | 0 | 0 |
| | | OVERSEAS DRAMA | 0 | 0 | 0 | 0 |
| 1114 | MUSIC | DOMESTIC ROCK'N'ROLL · POPS | 0 | 0 | 0 | 0 |
| | | OVERSEAS ROCK'N'ROLL · POPS | 0 | 0 | 0 | 0 |
| 1115 | VAUDEVILLE | QUIZ | 0 | 0 | 0 | 0 |
| | | GAME | 0 | 0 | 0 | 0 |
| 1116 | FILM | FOREIGN FILM | 16 | 12 | 80 | 80 |
| | | JAPANESE FILM | 14 | 10 | 70 | 70 |
| 1117 | ANIMATED FILM/ SPECIAL-EFFECTS FILM | DOMESTIC ANIMATED FILM | 20 | 20 | 100 | 100 |
| | | OVERSEAS ANIMATED FILM | 14 | 4 | 70 | 60 |
| | | SPECIAL-EFFECTS FILM | 20 | 20 | 100 | 100 |
| 1118 | DOCUMENTARY/ CULTURE | LOCAL NEWS/CURRENT EVENTS | 0 | 0 | 0 | 0 |
| | | HISTORY/TRIP | 0 | 0 | 0 | 0 |
| 1119 | EDUCATION | CONVERSATION · LANGUAGE | 16 | 0 | 0 | 0 |
| | | INFANT · ELEMENTARY SCHOOLCHILD | 20 | 0 | 0 | 0 |
| | | JUNIOR HIGH SCHOOL STUDENT · SENIOR HIGH SCHOOL STUDENT | 0 | 0 | 0 | 0 |

Columns: 1101 GENERAL CATEGORY, 1102 SPECIFIC CATEGORY, 1103 RECORDING TIME, 1104 VIEWING TIME, 1105 OLD EVALUATION, 1106 NEW EVALUATION

FIG.12

| | GENERAL CATEGORY | SPECIFIC CATEGORY | TASTE NEW EVALUATION VALUE | TASTE EVALUATION CHANGE | SCENARIO | DISCREPANCY DEGREE | INCREASE/DECREASE | RESULT |
|---|---|---|---|---|---|---|---|---|
| 1211 | SPORTS | SPORTS NEWS | 30 | -20 | 10 | 20 | -20 | ○ |
| | | BASEBALL | 40 | | 70 | -30 | 0 | △ |
| | | FOOTBALL | 70 | -10 | 10 | 60 | -10 | ○ |
| | | GOLF | 0 | | 10 | -10 | 0 | △ |
| 1212 | INFORMATION/WIDE SHOWS | ENTERTAINMENT/WIDE SHOWS | 0 | | 10 | -10 | 0 | △ |
| | | FASHION | 0 | | 10 | -10 | 0 | △ |
| | | LIVING-HOME | 0 | | 10 | -10 | 0 | △ |
| | | HEALTH/MEDICAL TREATMENT | 0 | | 10 | -10 | 0 | △ |
| 1213 | DRAMA | DOMESTIC DRAMA | 0 | | 10 | -10 | 0 | △ |
| | | OVERSEAS DRAMA | 0 | | 10 | -10 | 0 | △ |
| 1214 | MUSIC | DOMESTIC ROCK'N'ROLL · POPS | 0 | | 10 | -10 | 0 | △ |
| | | OVERSEAS ROCK'N'ROLL · POPS | 0 | | 10 | -10 | 0 | △ |
| 1215 | VAUDEVILLE | QUIZ | 0 | | 10 | -10 | 0 | △ |
| | | GAME | 0 | | 10 | -10 | 0 | △ |
| 1216 | FILM | FOREIGN FILM | 80 | | 10 | 70 | 0 | △ |
| | | JAPANESE FILM | 70 | | 10 | 60 | 0 | △ |
| 1217 | ANIMATED FILM/SPECIAL-EFFECTS FILM | DOMESTIC ANIMATED FILM | 100 | | 0 | 100 | 20 | × |
| | | OVERSEAS ANIMATED FILM | 60 | -10 | 10 | 50 | -10 | ○ |
| | | SPECIAL-EFFECTS FILM | 100 | | 0 | 100 | 20 | × |
| 1218 | DOCUMENTARY/CULTURE | LOCAL NEWS/CURRENT EVENTS | 0 | | 10 | -10 | 0 | △ |
| | | HISTORY/TRIP | 0 | | 10 | -10 | 0 | △ |
| 1219 | EDUCATION | CONVERSATION · LANGUAGE | 0 | | 80 | -80 | 0 | △ |
| | | INFANT · ELEMENTARY SCHOOLCHILD | 0 | | 100 | -100 | 0 | △ |
| | | JUNIOR HIGH SCHOOL STUDENT · SENIOR HIGH SCHOOL STUDENT | 0 | | 10 | -10 | 0 | △ |

VIEWING PROGRAM CONTROL METHOD AND VIDEO RECORDING APPARATUS

INCORPORATION BY REFERENCE

This application claims priority from Japanese patent application No. JP2005-317871 filed on Nov. 1, 2005, the content of which is hereby incorporated by reference into this application.

BACKGROUND OF THE INVENTION

The present invention relates to a video recording apparatus which receives contents including viewing programs via broadcasting and a wide-area network and records the contents therein and a viewing program control method for use with the same.

For video recorders for family use, the recording capacity has become increasing greater by use of a Video Tape Recorder (VTR), a Digital Versatile Disk (DVD), and a Hard Disk Drive (HDD). In a VTR and a DVD recorder (without an HDD), pictures can be successively recorded for about ten-odd hours and there does not exist a margin to record contents (programs) desired by the user. Therefore, the programs are recorded according to the indication from the user. However, in recently developed recorders with an HDD having a remarkably large recording capacity, more than several hundred to several thousand programs can be successively recorded. There are consequently proposed and/or developed various functions in which programs not likely to be desired or preferred by the user are also automatically recorded and the user thereafter selects desired ones therefrom.

The automatic video recording methods are classified into two types, i.e., a method of recording all programs for a predetermined period of time and a method of recording part of the programs for a predetermined period of time. In the first method, the user can playback any program after the broadcasting of the programs. However, a large number of tuners and a large volume of recording areas (such as an HDD) are required to record all programs therein. That is, the method of recording all programs is not efficient in consideration of the ratio of the programs actually played back by the user to all programs thus recorded. In the second method, only the programs to be likely viewed by the user are recorded and hence the recording areas and the tuners are efficiently used. Since programs likely to be viewed by the user are selected in this method, there has been proposed a method of automatically recording such programs on the basis of a history of programs viewed by the user (reference is to be made to JP-A-05-062283). According to the method, it is assumed that the contents actually viewed by the user are the contents which are likely to be desired by the user. Contents similar to those viewed by the user are recorded assuming that such contents are likely to be viewed by the user. Moreover, there has been proposed a method in which the user inputs information of his or her taste (degree of interest) such that contents related to the taste information are recorded as those to be likely viewed by the user (reference is to be made to JP-A-06-124309).

However, according to these methods, if there exists deviation in the learning algorithm of the video recording apparatus or in the initial setting conducted by the user, there possibly occurs a case in which only part of programs regarded as preferable for the user are recorded. To solve the problem, there has been proposed a method in which an objective criterion is introduced from an external device to the video recording apparatus to determine programs to be automatically recorded (reference is to be made to JP-A-2005-184289).

SUMMARY OF THE INVENTION

The above methods aims at obtaining the user's taste to record contents which are considered to be desired by the user to the maximum extent.

However, when the automatic content recording is employed, since it is the object to record contents according to the user's taste, the learning of the user's tastes are continuously enhanced. That is, if the automatic recording apparatus is used by, for example, a child, the apparatus accumulates only the programs preferred by the child.

On the other hand, as a method of restricting the collection/viewing of the contents, there has been commonly utilized a method of filtering contents. Generally, there is employed a method in which, for example, an age limit is set to the video recording apparatus to record only the contents beyond the age limit or a method to record only the contents other than those having metadata of contents associated with particular keywords. This is particularly used to restrict the viewing of the adult contents by the children.

When the content automatic recording using the user's taste is combined with the video recording using the content filtering, the particular contents such as adult contents can be restricted. However, there also remains the problem that only the programs of preferred genres not filtered are recorded.

By attempting to solve the problem using the content filtering, there contrarily occurs a problem that preferred programs are not recorded. The inherent object of the content automatic recording cannot be achieved.

The setting of a filtering condition is quite complex and troublesome. To set an appropriate filtering condition which prevents the video recording of the programs of particular genres, it is required that the user conducts many operations or that a highly prepared filtering condition is downloaded from an external device.

That is, even when the automatic video recording of contents using the user's taste is combined with the content filtering, the contents thus recorded are those not including the contents of the particular genres. As a result, there are recorded the contents not appropriately reflecting the user's taste.

The problem to be solved by the present invention is to meet the requirement that the contents to be viewed are restricted to a certain extent while recording contents matching the user's taste.

To solve the problem according to the present invention, an automatic video recording function of the content recording apparatus includes a scenario setting function to set a scenario such that contents matching the user's taste are automatically recorded together with contents matching the scenario and an index of the contents matching the scenario is displayed together with an index of the contents matching the user's taste. The content recording apparatus includes means for receiving a content, means for receiving metadata of a content, means for inputting or selecting a scenario, means for reflecting a taste of a user in an algorithm for the automatic recording, means for reflecting a scenario in an algorithm for the automatic recording, means for recording a content according to the algorithm for the automatic recording, means for outputting an index of contents recorded in advance, and means for outputting contents by selecting an index of contents recorded in advance.

According to the present invention, only by setting a scenario, there is obtained an advantage that the user's taste can be guided according to the desire (scenario) while recording the contents matching the taste.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing an overall system configuration of an embodiment of a video recording system according to the present invention.

FIG. 2 is a state transition diagram of the embodiment.

FIG. 7 is a table showing an example of setting a profile in the embodiment.

FIG. 8 is a table showing an example of setting taste items in the embodiment.

FIG. 9 is a table showing an example of setting a scenario in the embodiment.

FIG. 10 is a table showing an example of setting a filtering condition in the embodiment.

FIG. 11 is a table showing an example of history data in the embodiment.

FIG. 12 is a table showing an example of correction data in the embodiment.

DESCRIPTION OF THE EMBODIMENTS

Figure 3:
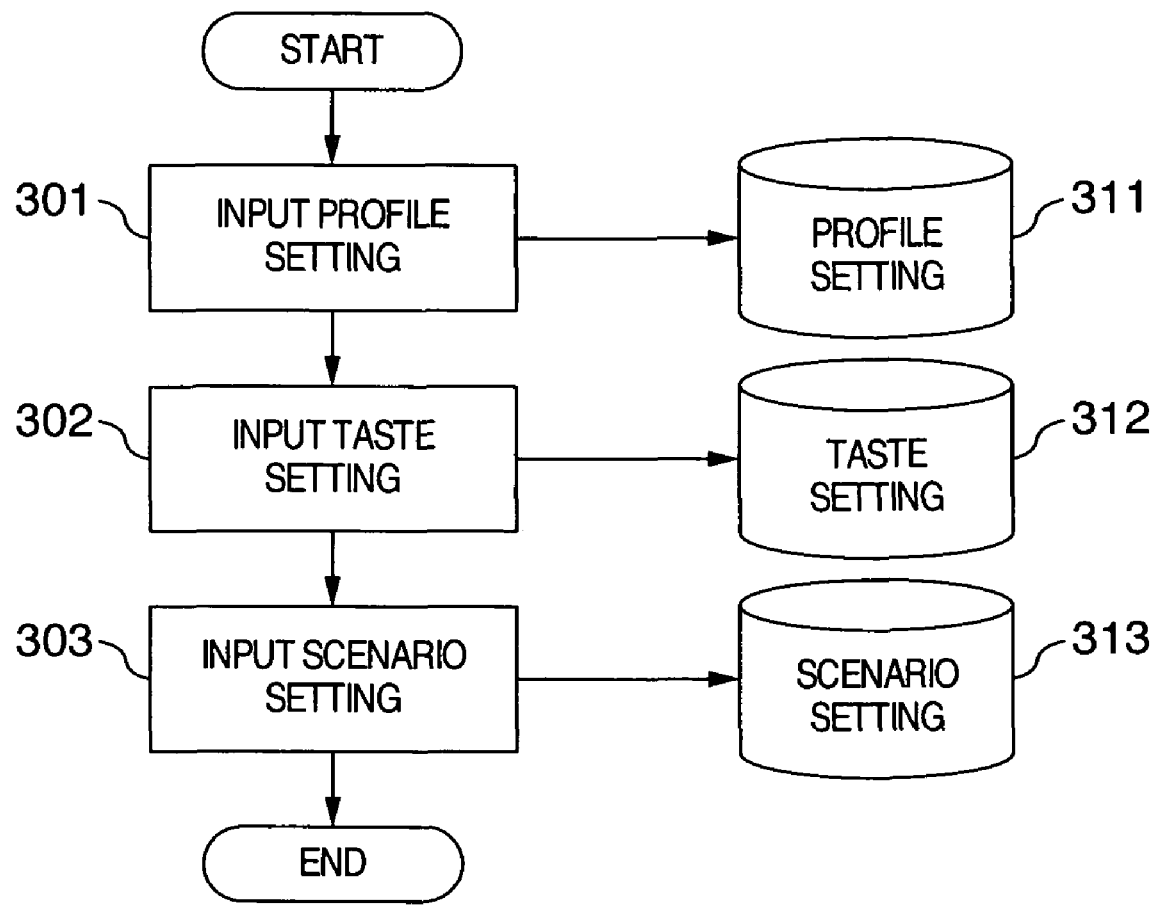
FIG. 3 is a flowchart showing a basic flow of setting items in the embodiment.

The object of the present invention is achieved through minimum user's operation, that is, the taste of the user to view contents is guided according to a scenario set by the scenario setting function disposed in the content automatic recording apparatus.

Referring now to the drawings, description will be given of a first embodiment of the present invention.

FIG. 1 shows an entire configuration of the embodiment of the content automatic recording apparatus according to the present invention.

In FIG. 1, numeral 101 indicates a scenario control section to set a scenario and to calculate an evaluation value. Numeral 102 is a taste control section to set a scenario and to calculate an evaluation value. Numeral 103 is a content receiving section to receive programs transmitted from a broadcasting or television station. In this connection, the broadcasting station transmits programs using not only electric waves but also using the internet. The content receiving section 103 also receives metadata of contents. The metadata is data to explain the items of the associated content such as data items of a genre, a related keyword, a title of the content, and players thereof.

Numeral 104 indicates a content recording setting section to reserve recording by use of evaluation values regarding a scenario and a taste. The section 105 conducts video recording on the basis of the recording reservation thus set in advance. Numeral 106 is a content playback section to playback the content in a form to be displayed. In this regard, the content may be displayed on a screen by use of a content display.

FIG. 2 shows a state transition of the embodiment of the content automatic recording apparatus according to the present invention.

When the system is activated, the apparatus enters an initial state 201. When the setting operation is started in response to an indication form the user, the apparatus passes through states as shown in a basic setting flow of FIG. 3 to input initial values to set a profile, a taste, and a scenario. In the profile setting, information items unique to the user such as an age, an address, and an occupation of the user are set. The profile setting will be described in detail when description will be given of FIG. 7. In the taste setting, information items of the user's taste regarding the viewing of contents are set. Each evaluation value of the taste setting changes starting at the initial value as the taste learning proceeds in association with the operation by the user. The taste setting will be described in detail when description will be given of FIG. 8.

In the scenario setting, there is set a target value of the evaluation value of each user's taste. This setting is an aspect of the present invention. The scenario setting will be described in detail when description will be given of FIG. 9. When the profile, the taste, and the scenario are set, the recording apparatus enters a video recording waiting state 203.

Figure 4:
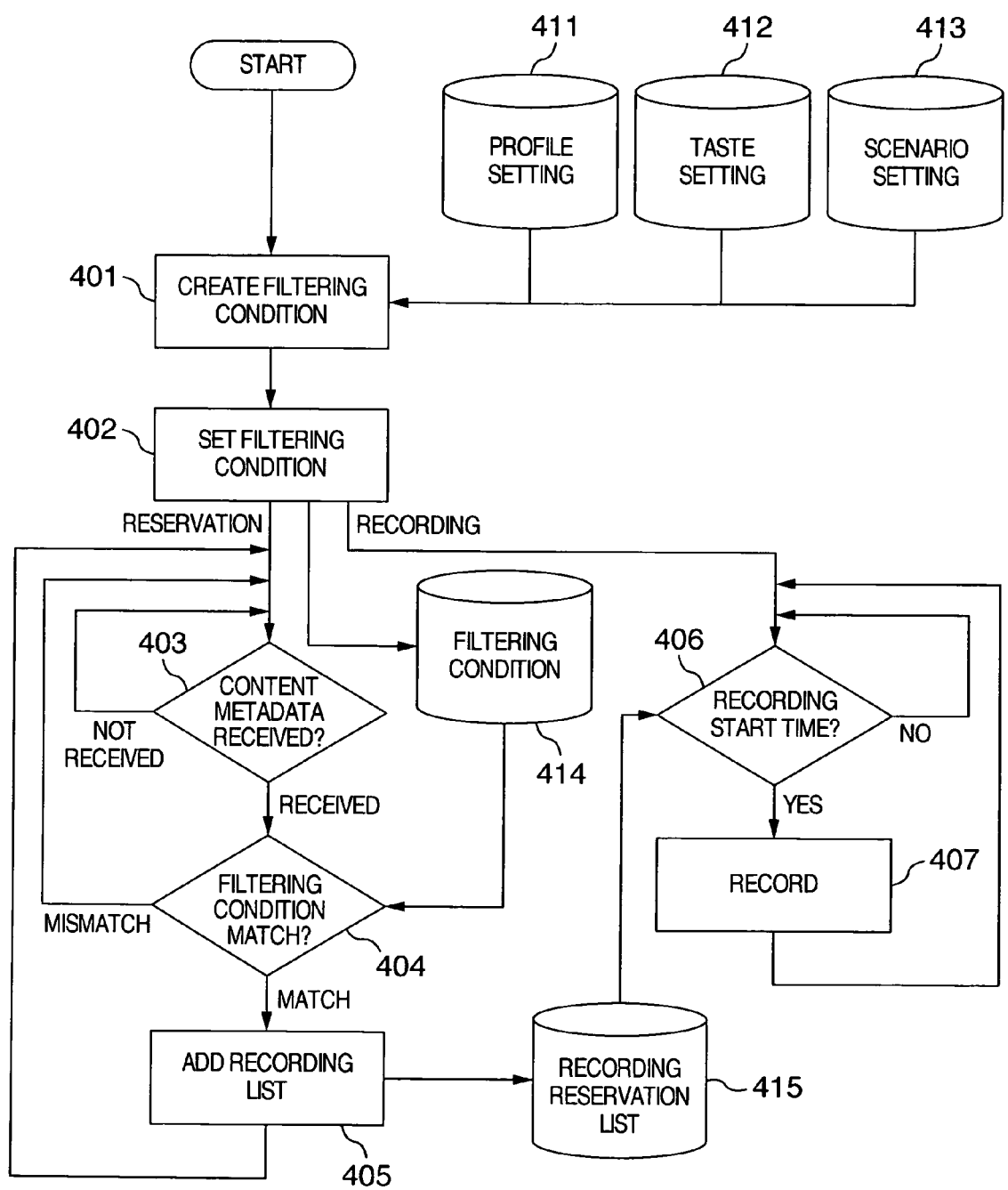
FIG. 4 is flowchart showing a basic flow of video recording in the embodiment.

The state 203 is a state as shown in the basic recording flow of FIG. 4 in which the metadata items of contents are obtained and recording of contents matching the filtering condition is reserved, and then the contents are recorded. The filtering condition will be described later in conjunction with FIG. 10. In this state, when it is indicated to display the recorded contents, the state of the recording apparatus changes to a recorded content display state 204.

Figure 5:
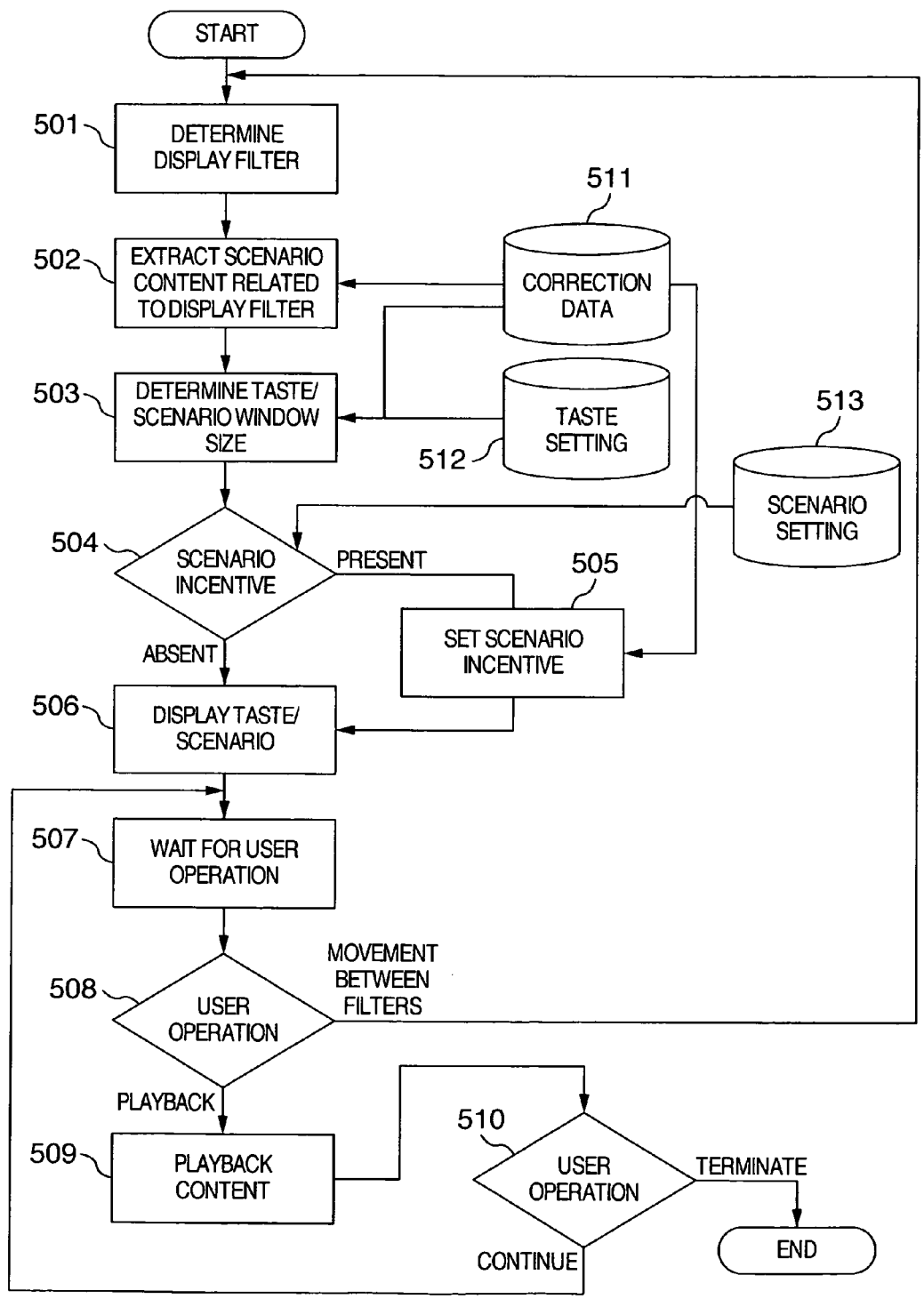
FIG. 5 is flowchart showing a basic flow of displaying information in the embodiment.

In the state 204, according to the evaluation values of the taste and the scenario, a list of contents are displayed to thereafter waits for a playback indication from the user as shown in the basic display flow of FIG. 5. When the user indicates video playback, a state transition occurs to a playback state 205. After the recorded contents are displayed, the state is changed to the recording wait state 203.

Figure 6:
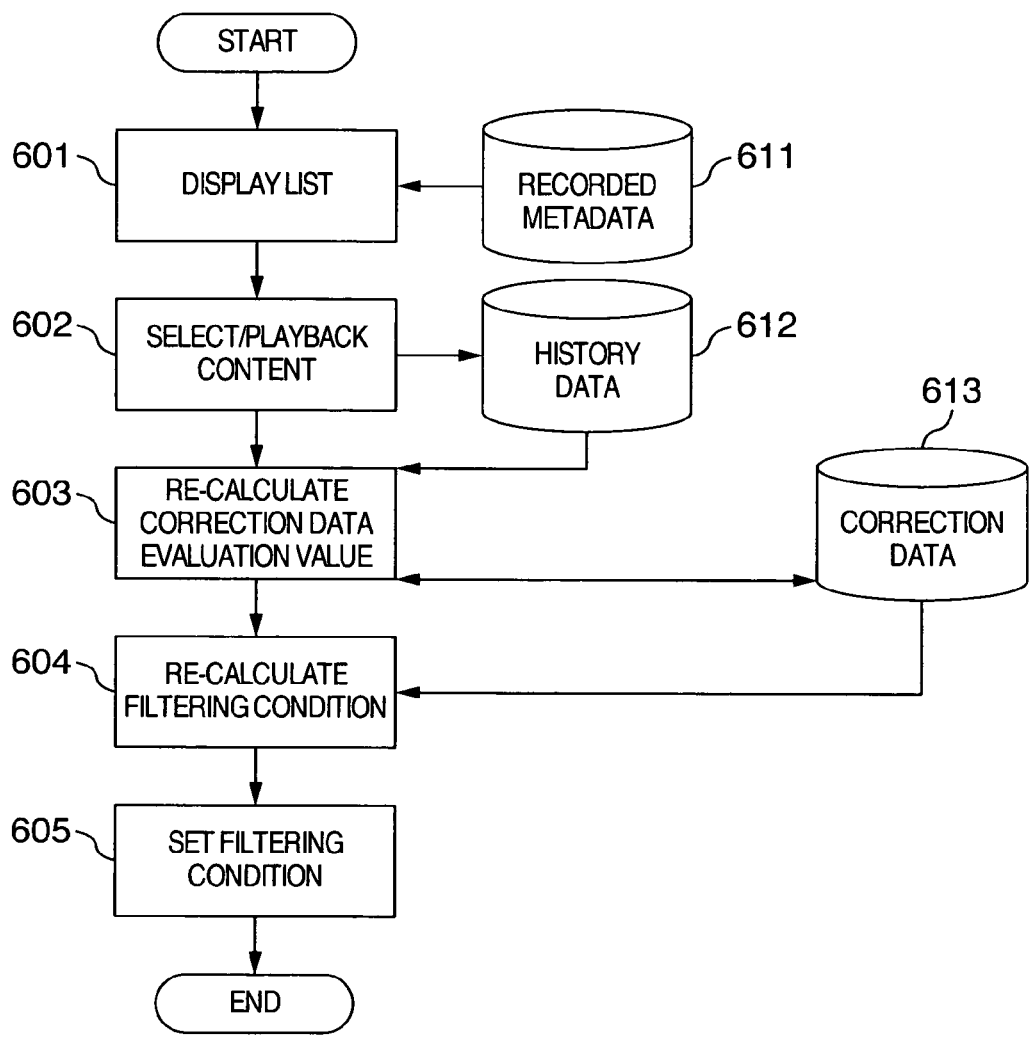
FIG. 6 is flowchart showing a basic flow of video reproduction in the embodiment.

In the playback state 205, the indicated contents are played back as shown in a basic playback flow of FIG. 6. In the operation, the history data is updated and the correction data is calculated to set the filtering condition again. The history data will be described later by referring to FIG. 11. The correction data will be described later by referring to FIG. 12. When the playback is stopped, the history data is changed to the recorded content display state 204.

Referring now to FIG. 3, description will be given of the basic flow to set items.

The user inputs items for the profile setting 311, the taste setting 312, and the scenario setting 313. The order of the steps 301 to 303 may be changed. In a case in which a plurality of users use one content automatic recording apparatus, to change the setting items for each user, information to identify each user such as an identifier and/or a name of the user may be inputted before the step 301. The general method in which the setting values are kept for each user by identifying the user may be applied generally to the present embodiment.

Next, description will be given of the basic flow to record contents by referring to FIG. 4.

A filtering condition 414 is created (401) by use of the profile setting 411, the taste setting 412, and the scenario setting 413. The filtering condition is a condition to determine, when content metadata is received, whether or not the content under consideration is to be recorded.

When the filtering condition is set (402), the flow for the reservation or the flow for the recording concurrently operates.

First, in the reservation flow, the process waits for reception of content metadata (403). When content metadata is received, a check is made to determine whether or not the content matches the filtering condition (404). If the content matches the filtering condition, the content is added to a recording reservation list 415 (405).

Otherwise, the process again waits for reception of content metadata. In this connection, a plurality of contents may match the filtering condition. In such situation, the plural contents are reserved for recording.

In the recording flow, the process waits for a recording start time to record the recording reservation content (406). At the recording start time, the content recording is started.

Referring next to FIG. 5, description will be given of the basic flow to display contents. When the processing is started, the user or the video recording apparatus determines a display filter (501). The display filter is a condition to determine contents is to be displayed.

For example, in a case of a screen to display contents of which the genre is sports, the display filter is "genre:sport". In another example, in a case of a screen to display contents dated "Jul. 30, 2005", the display filter is "year, month, day: 2005, 7, 30". On the other hand, in a case in which the contents are displayed in an order of the user's taste regardless of the genres, there is not used a display filter. This is equivalent to a case in which the display filter is set as "all". That the video recording apparatus indicates a display filter means that the apparatus determines that, for example, the display filter set to the apparatus is to be used.

Next, scenario contents related to the display filter are extracted (502). The scenario contents are contents derived from correction data 511. The correction data includes data (degree of discrepancy) indicating discrepancy between the taste and the scenario. The scenario contents are selected in an descending order of the discrepancy degree.

Next, the window size of the taste/scenario window is determined by use of the correction data 511 and the taste setting 512 (503). The taste window indicates the number of contents which match the taste and which are to be displayed. The scenario window indicates the number of scenario contents to be displayed. The total value of the taste window size and the scenario window size is a fixed value derived from the screen layout.

For the window size, for example, when the user's discrepancy degree is large, the scenario window size is larger than the taste window size. When the user's discrepancy degree is small, the taste window size is larger than the scenario window size. This is because the user's taste possibly takes precedence when the user has a taste similar to the scenario to the maximum extent.

For example, in a case in which the total value of window size is 16, if the user's discrepancy degree is large, the window size and the scenario size are set to eight. Conversely, if the user's discrepancy degree is small, the window size is set to 14 and the scenario size are set to two.

The contents matching the user's taste are displayed within the taste window, and the contents matching the scenario are displayed within the scenario window. In this connection, each window is an area obtained by dividing the actual screen area or an area on the calculation.

Next, by use of the scenario setting 513, a check is made to determine whether or not the incentive has been set in the scenario (504). If no incentive has been set, the taste and the scenario are displayed (506). Otherwise, by use of the value of the correction data 511, the process makes the setting to display the incentive of the scenario together with the scenario content (505).

The incentive is a reward, for example, points which the user obtains by viewing the content. When the incentive setting is made, the incentive is displayed together with the taste/scenario (506).

The process waits for an operation by the user (507). If the user indicates movement between filters by his or her operation, the process determines the display filter (501) to continue the processing. If the user indicates playback, the content is played back (509). When the content playback is finished, the process again waits for an operation by the user (510). To continue the processing, the process keeps waiting for the user's operation (507). To terminate the processing, the process terminates the entire processing.

Referring next to FIG. 6, description will be given of the basic flow of the video playback.

First, a list of recorded content metadata 611 is displayed (601). Step 601 corresponds to the basic display flow shown in FIG. 5. When the user selects a content and issues an indication to playback the content, the content is recorded in the history data 612 (602). When the playback is finished, the evaluation value of the correction data 613 is again calculated using the history data 612 and the correction data 613 (603).

Next, by use of the obtained correction data, the filtering condition is again calculated (604). The filtering condition is then set to wait for content metadata (605). In this connection, the evaluation value of the taste setting may be updated using the history data. Steps 604 and 605 correspond respectively to steps 401 and 402 of the basic flow of the video recording shown in FIG. 4.

Next, referring to FIG. 7, description will be given of the profile setting. The profile setting includes private information of the user not directly related to the taste setting and is used to complement the taste setting. For example, in a case in which the content metadata is classified into data for men and data for women, the profile setting is used as below. According to the value of the sex in the profile setting, the evaluation value is increased for the contents associated with the value of the sex and the value is decreased for the contents not associated therewith to thereby change the chance of the video recording. Numerals 701 and 702 indicate postal code numbers of a user's address and a user's working place address, respectively. Numeral 703 is the age, numeral 704 is the sex, numeral 705 is the business type, and numeral 706 is a job type.

Description will now be given of the taste setting by referring to FIG. 8. The taste setting represents a kind of contents which the user prefers or which the user will not view. The user may set the initial values in the taste setting. The setting includes a general category 801 and a specific category 802 to set an evaluation value 803 to each specific category. In this example, the evaluation value ranges from 100 to 0. The higher the evaluation value of a genre is, the more the user prefers the genre. The lower the evaluation value of a genre is, the less the user is interested in the genre.

To each specific category, a keyword 804 may be set. If there exists a keyword matching content metadata, the evaluation value thus set is added. Numerals 811 to 819 indicate respective genres. In the example, "Japanese films" of a general category 816 has an evaluation value of 70. If content metadata includes a keyword of "action", the evaluation value is 80.

Description will now be given of the scenario setting by referring to FIG. 9. The scenario setting is a target as a guide for the user to set his or her taste. There can be considered a method in which, for example, items of content metadata are used to set the scenario. A general category 901 and a specific category 902 are respectively similar to the general category 801 and the specific category 802 of the taste setting.

In this example, a recommendation genre 911 and an avoidance genre 912 are used. The recommendation genre is a genre of contents to recommend the user to view the contents. The avoidance genre is a genre of contents which are not recommended for the user, that is, it is favorable that the user possibly avoid viewing the contents. An evaluation 903 indicates a degree of recommendation or avoidance and sets an evaluation for the recommendation genre or the avoidance genre. For a content not associated with the evaluation, a standard point set to the system is used. The point is ten in this example.

An incentive field 905 is a reward for the user when a content related to the scenario is played back. For example, when the incentive is "point +4", four points are given to the user if the user views the associated content. The incentive 905 may also be used as a penalty item when the incentive is applied to the avoidance genre. In this situation, the penalty is imposed, for example, to reduce predetermined point.

In the example, the system sets items with a desire such that the user views "conversation, languages" in a specific category of the general category "education". If content metadata includes a keyword of "English" in the contents of the genre, the evaluation value is 90.

Next, the filtering condition will be described by referring to FIG. 10. The filtering condition is a condition to determine whether or not the automatic video recording is conducted. Numerals 1001 and 1002 are items of content metadata and numerals 1011 to 1019 indicate genres of contents. Numeral 1003 is evaluation to determine whether or not the content is to be recorded. Numeral 1004 is a keyword. If the keyword matches with the content, points are added or subtracted. This condition is used such that all contents having the evaluation value of, for example, 50 or more are recorded in the automatic video recording apparatus. For the threshold value of the evaluation value for the actual recording, the recording apparatus may calculate an appropriate value using a free recording area or the like.

Next, referring to FIG. 11, description will be given of the history data. The history data is data indicating how long the user has viewed the content under consideration. A general category 1101 and a specific category 1102 are similar to those of the content metadata. Numerals 1111 to 1119 indicate actual genres. A recording time 1103 is a period of time in hours for which the content is actually recorded using the filtering condition. A viewing time 1104 is a period of time in hours for which the recorded content is actually viewed.

An old evaluation 1105 is the evaluation before the value is calculated according to the history data. A new evaluation 1106 is the evaluation after the value is calculated again according to the history data. The recording time 1103 and the viewing time 1104 are updated when the recording and the playback are respectively conducted. The old evaluation 1105 contains a value to be copied from the new evaluation 1106 in the filtering condition creation 401. The new filtering condition thus created is set to the new evaluation field 1106.

Next, the correction data will be described by referring to FIG. 12. The correction data is information indicating how to bring the user's taste close to the scenario. A general category 1201 and a specific category 1202 are similar to those of the content metadata. Numerals 1211 to 1219 indicate actual genres. A taste new evaluation value 1203 is the new evaluation 1106 calculated using the history data. A taste evaluation change 1204 is the difference between the new evaluation 1106 and the old evaluation 1105. A scenario 1205 is a field to which a scenario setting value or a system default value, i.e., "10" is set.

A discrepancy degree 1206 is the discrepancy between the taste new evaluation 1203 and the scenario 1205. An increase or decrease 1207 is a value to be added to the old evaluation calculated using the history data. For example, if the old evaluation is "80" and the value to be added is "10", the increase or decrease 1207 is equal to the taste evaluation change 1204. However, if the old evaluation is "100" and the value to be added is "20", the increase or decrease 1207 is "20" and the taste evaluation change 1204 is "0". That is, the increase or decrease 1207 represents a tendency of the user operation. If the discrepancy degree 1206 and the increase or decrease 1207 have mutually opposing signs, it can be considered that the user's taste has been corrected or improved. Contrarily, if the discrepancy degree 1206 and the increase or decrease 1207 have the same sign, it can be considered that the user's taste has been deteriorated. The result is indicated by a field 1208.

Figure 13:
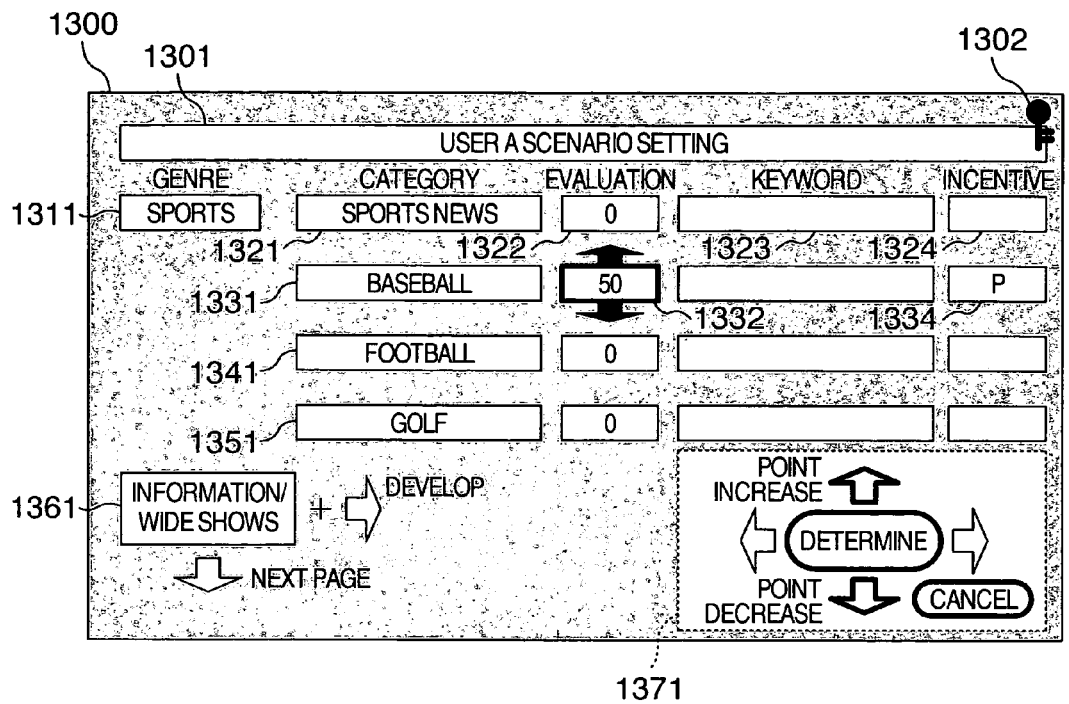
FIG. 13 is a diagram showing an example of a scenario setting screen in the embodiment.

Next, referring to FIG. 13, description will be given of the scenario setting. Numeral 1300 is a scenario setting screen. Numeral 1301 is a field indicating that the screen is the scenario setting screen. Numeral 1302 is a field indicating that the scenario setting is allowed only for a qualified user. For example, only when the user inputs a particular password to the content automatic recording apparatus, the user can input a scenario in the scenario setting screen. Numeral 1311 is a general category of content metadata. Numerals 1321 to 1351 are items belonging to the general category 1311. Numeral 1322 is an evaluation. It is indicated in this situation that the field 1322 is being set.

When the up button of the input device of, for example, a remote control is depressed, the evaluation value increases. When the down button is depressed, the evaluation value decreases. Numeral 1323 indicates a keyword. Numeral 1324 is "incentive". Particularly, numeral 1334 indicates that the incentive has been set. Like numeral 1311, numeral 1361 is a general category. With the focus set to the field 1361, if the down button is depressed in the input device, the next page is displayed. If the right button is depressed, the specific categories 1321 to 1351 are developed. Numeral 1371 shows buttons available in the current input device. In the example, the user may depress the up and down buttons, "determine button", and "cancel button".

Figure 14:
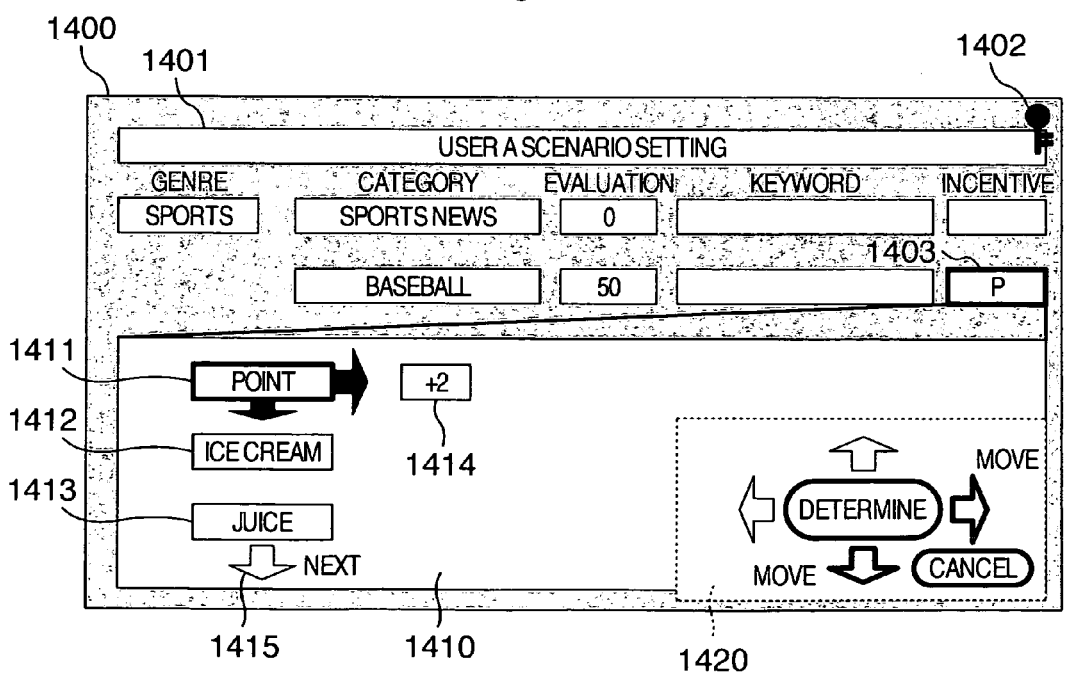
FIG. 14 is a diagram showing an example of an incentive setting screen in the scenario setting operation in the embodiment.

Next, the incentive setting will be described by referring to FIG. 14. Numeral 1400 indicates an incentive setting screen. Numeral 1401 indicates that the screen is a scenario setting screen. Since the incentive setting is part of the scenario setting, a field 1401 displays an item equal to that displayed in the field 1301. This also applies to a field 1402 and the field 1302. A field 1403 indicates the incentive setting in a selected state. With the field 1403 in the selected state, if the user depresses the determine button, a detailed screen 1410 of the incentive setting is displayed.

Fields 1411 to 1413 indicate options for the incentive. In a case in which, for example, a field 1411 is set as an incentive, if the associated content is played back, points are added. The points are indicated by a field 1414, which can be set by the user. A field 1415 is a button on the screen to present another incentive item. A field 1420 shows buttons available in the current input device.

Figure 15:
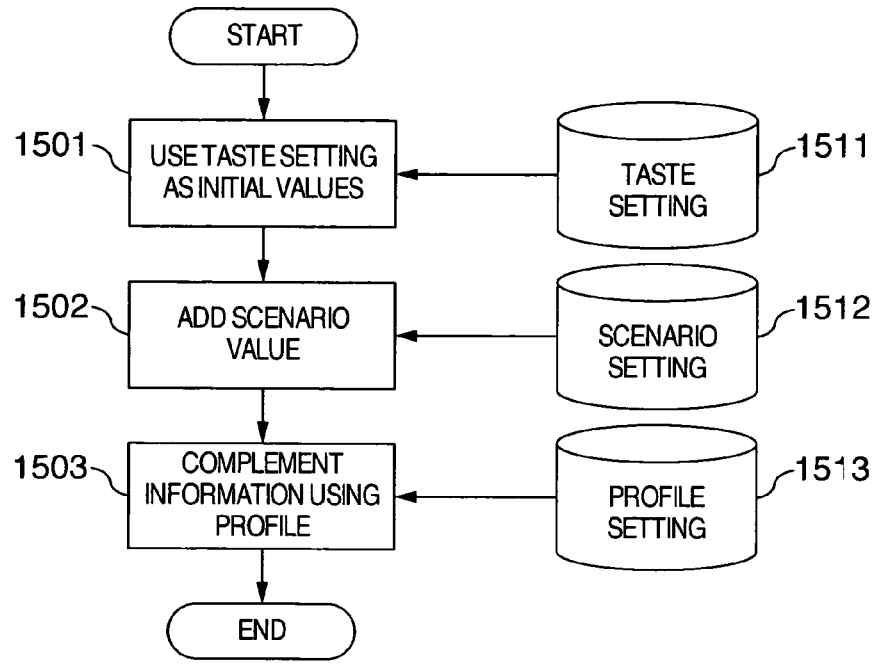
FIG. 15 is flowchart showing a flow of creating a filtering condition in the embodiment.

Next, the filtering condition creating flow will be described by referring to FIG. 15. When the processing is started, the taste setting 1511 is used as initial values (1501). Thereafter, the scenario setting 1512 is added to the taste setting set in step 1501 (1502). Thereafter, using the profile setting 1513, the taste setting made in step 1502 is complemented (1503).

The configuration described above is used when the content automatic recording apparatus to receive and to record contents processes the scenario without using a network. The index of contents is presented to the user according to the scenario set in advance. This leads to an advantage to increase the chance for the user to view the contents according to the scenario. This also applies to the incentive.

Next, description will be given of a configuration to obtain information regarding the scenario via a network.

Figure 16:
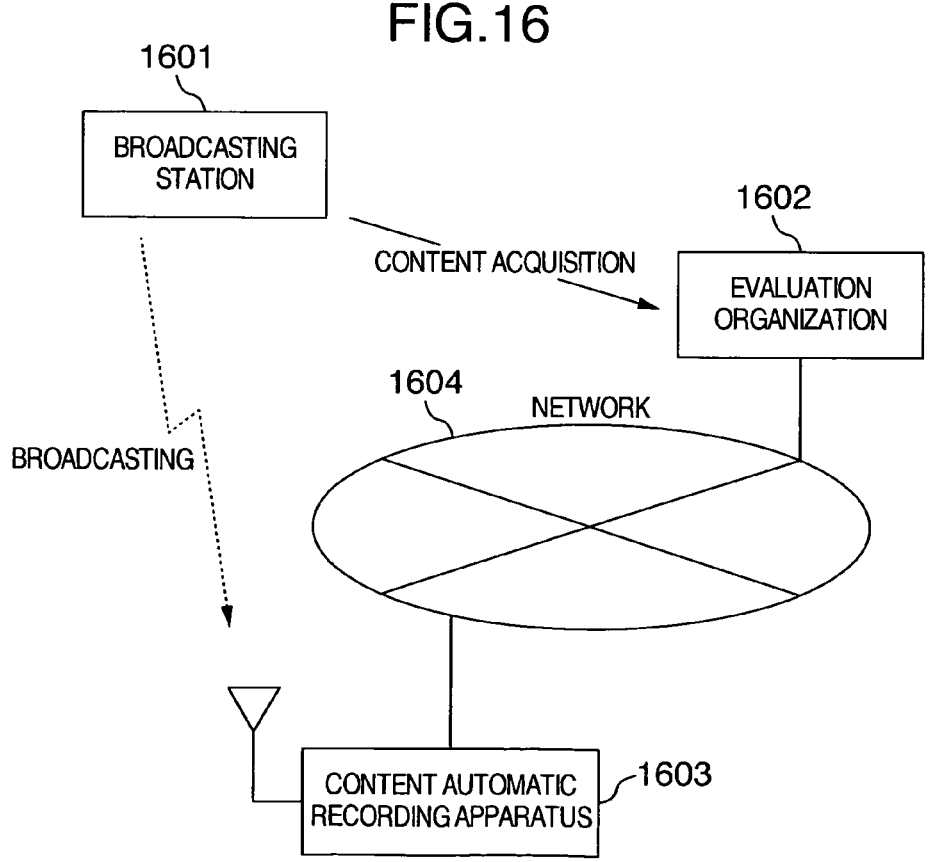
FIG. 16 is a diagram showing a configuration to use an evaluation organization via a network according to the embodiment.

FIG. 16 is a configuration diagram when information regarding the scenario is obtained via a network 1604 from an evaluation organization 1602. The organization 1602 is a broadcasting station to provide contents. The broadcasting station also provides metadata. Numeral 1602 is an evaluation organization which provides an unclear or ambiguous scenario supplied from the user, in the form of an appropriate filtering condition. The organization also provides unique metadata of contents.

The unclear scenario supplied from the user is a scenario set, for example, as "a child who likes natural science". Even if the scenario of this kind is set to the filtering condition of the automatic recording apparatus, there cannot be obtained a content matching the condition. Actually, it is required to convert the filtering condition to, for example, "genre: education, keyword: natural science". This operation is conducted by the evaluation organization 1602. It is also possible that the evaluation organization provides, as a template, a scenario including an available filtering condition. The content automatic recording apparatus downloads the template from the evaluation organization to use the template.

The unique metadata of the evaluation organization 1602 is provided as data including an objective evaluation since the metadata provided from the broadcasting station 1601 is not necessarily an objective evaluation. If it is possible to obtain the metadata before the broadcasting of the content, the content automatic recording apparatus can use the metadata as metadata received in step 403. If the recording apparatus obtains the metadata after the broadcasting (recording), the content selecting step is again conducted for the recorded contents using the filtering condition. The contents not matching the filtering condition are deleted or are displayed with a lower priority level in step 506 (display taste/scenario).

As above, by using an external evaluation organization via a network, there can be employed more objective metadata. Moreover, it is also possible to use an unclear scenario and a scenario matching current events. This leads to an advantage that various scenarios can be set through a simple user operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A content recording apparatus to conduct automatic recording of a content, comprising:
   means for receiving a content;
   means for receiving metadata of a content;
   means for inputting or selecting a scenario;
   means for reflecting a taste of a user in an algorithm for the automatic recording;
   means for reflecting a scenario in an algorithm for the automatic recording;
   means for recording a content according to the algorithm for the automatic recording;
   means for outputting an index of contents recorded in advance; and
   means for outputting contents by selecting an index of contents recorded in advance,
   wherein the algorithm for the automatic recording records all contents of genres of which an evaluation value calculated using the taste and the scenario is equal to or more than a fixed value.

2. A content recording apparatus according to claim 1, wherein the algorithm for the automatic recording conducts calculation, if a keyword matches a keyword set in advance, by adding a setting value to the evaluation value.

3. A content recording apparatus to conduct automatic recording of a content, comprising:
   means for receiving a content;
   means for receiving metadata of a content;
   means for inputting or selecting a scenario;
   means for reflecting a taste of a user in an algorithm for the automatic recording;
   means for reflecting a scenario in an algorithm for the automatic recording;
   means for recording a content according to the algorithm for the automatic recording;
   means for outputting an index of contents recorded in advance; and
   means for outputting contents by selecting an index of contents recorded in advance,
   wherein the means to output an index of recorded contents calculates a ratio between a taste window and a scenario window using correction data.

4. A content recording apparatus according to claim 3, wherein:
   the taste window indicates the number of contents related to a taste, the contents being displayed in the index; and
   the scenario window indicates the number of contents related to a scenario, the contents being displayed in the index.

5. A content recording apparatus according to claim 3, wherein the correction data keeps therein, as a discrepancy degree, a difference between an evaluation value of the taste and an evaluation value of the scenario.

* * * * *